Torrey & Tilton,
Door Spring.

No. 1,404. Reissued Feb. 10, 1863.

N. PETERS, PHOTO-LITHOGRAPHER, WASHINGTON, D. C.

UNITED STATES PATENT OFFICE.

A. J. STORMS AND H. E. STORMS, OF NYACK, NEW YORK, ASSIGNEES OF EDWARD P. TORREY AND WM. B. TILTON.

IMPROVEMENT IN DOOR-SPRINGS.

Specification forming part of Letters Patent No. 18,164, dated September 8, 1857; Reissue No. 1,404. dated February 10, 1863.

*To all whom it may concern:*

Be it known that EDWARD P. TORREY and WILLIAM B. TILTON, both of the city, county, and State of New York, have invented a new and useful Improvement in Door-Springs, for which Letters Patent have been granted to them September 8, 1857; and we, A. J. STORMS and H. E. STORMS, both of Nyack, in the county of Rockland and State of New York, sole owners of all the right, title, and interest granted to said TORREY and TILTON under said Letters Patent, by assignment duly recorded in the Patent Office, do hereby declare that the following is a full, clear, and exact description of said invention, reference being had to the accompanying drawings, forming a part of this specification, in which—

Figure 1:
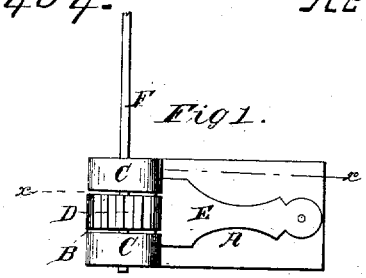
Figure 5:
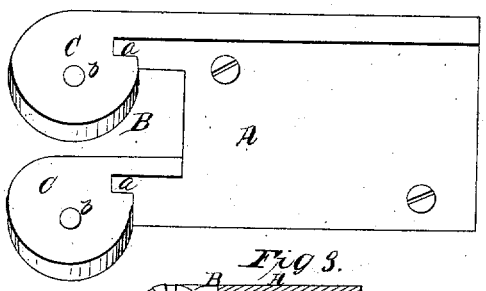
Figure 2:
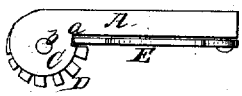
Figure 3:
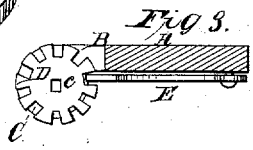
Figure 4:
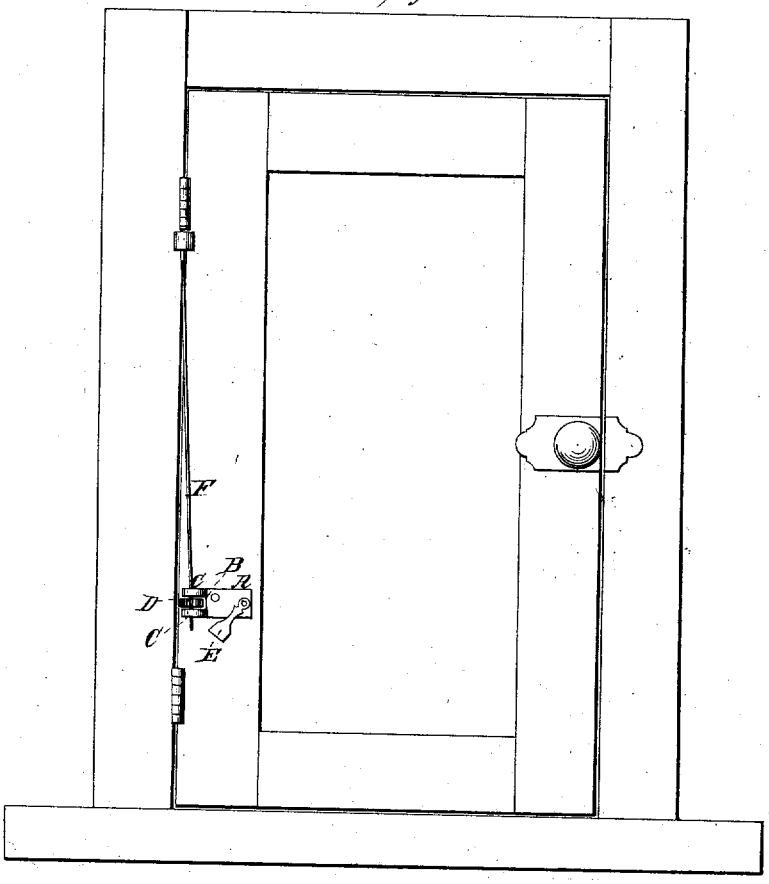

Figure 1 is a side view of the bracket having its parts arranged according to said invention. Fig. 2 is an edge view of the same. Fig. 3 is a horizontal section of the same. Fig. 4 is a front view of a door with the improved bracket and the torsional rod applied to it. Fig. 5 is a perspective view of the bracket minus the notched wheel and stop-plate.

Similar letters of reference in the several views indicate corresponding parts.

The object of this invention is to render practicable and useful the adjusting-bracket of the upright torsional-rod spring contrived by J. Riggin, said bracket consisting of a turning socket with a flange at its upper end, in which flange a series of adjusting-holes are formed. A bracket thus constructed is objectionable, first, because its adjusting-socket and flange is liable to be twisted and sprung up out of its seat, particularly by the contraction of the torsional rod during the act of twisting the same; and second, because the torsional rod can not be set to the desired tension, except with great labor and with a peculiar instrument; and third, because the pin, which is necessarily used to hold the spring to whatever tension it may be adjusted, is continually being snapped or cut off. These objections are overcome, first, by placing the notched adjusting-wheel or socket between the two jaws of the bracket in such a manner that the same is held in place and prevented from being twisted or springing out of its place; second, by extending the torsional rod through the bracket and making its end square it can be set to the desired tension by an ordinary wrench with a square hole fitting to the end of the rod; third, by the use of the pivoted stop-plate catching into suitable notches in the rear edges of the jaws of the bracket and in the notches of the adjusting-wheel the torsional rod can be retained in any position and at any desired tension with perfect safety.

By referring to the drawings, it will be noticed the bracket A is constructed with an open central slot, B, in its outer end, forming two jaws, C C, which are provided with central holes, *b*, to receive the torsional rod F. This rod passes freely through the jaws of said bracket, and its lower end is made square to fit into the notched wheel or barrel D. This wheel is placed between the jaws C C, as clearly shown in Fig. 1 of the drawings, so that it is prevented from springing up or being twisted out of its seat. The square end of the torsional rod F extends clear through the bracket A, so that an ordinary screw-wrench or pliers can be applied to it for the purpose of setting the same to the desired tension.

E is a stop-plate which is pivoted to the bracket A and which catches into notches *a* in the rear edges of the jaws C, as clearly shown in Figs. 2 and 3. When the wheel D is in its place, the plate E also catches into the notches of said wheel and retains it in whatever position it may be brought. The notches A in the jaws hold the plate E firmly in position and prevent it being forced up or down by the torsional power of the rod F. The spring or torsional rod is not liable to loose its tension by the snapping or cutting off of the stop device, and it can be set and retained at the desired tension with the greatest facility.

What we claim as new, and desire to secure by Letters Patent, is—

1. Placing the notched wheel D between the jaws C of the bracket A, substantially as and for the purpose shown and described.

2. Extending the square end of the torsional rod F clear through the jaws of the bracket A, as and for the purpose specified.

3. The arrangement of the pivoted stop-plate E, in combination with the notches *a* in the jaws of the bracket and with the notched wheel D, all constructed and operating substantially in the manner and for the purpose set forth.

A. J. STORMS.
H. E. STORMS.

Witnesses:
D. D. DEMAREST.
H. ONDERDONK.